Dec. 17, 1929.  S. E. SCHROEDER  1,739,616
GEAR HOUSING FOR WASHING MACHINES
Filed Jan. 20, 1923
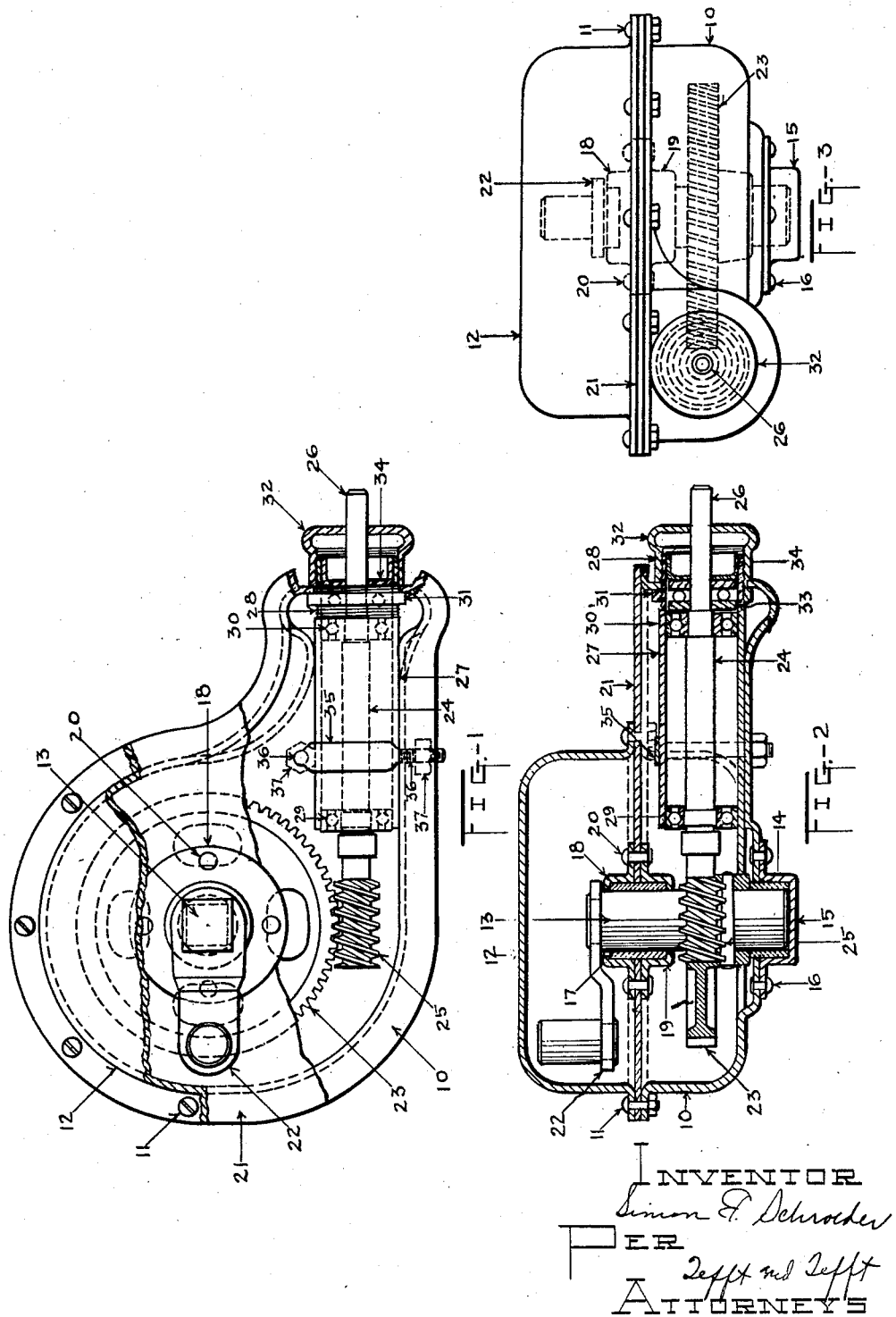
INVENTOR
Simon E. Schroeder
PER
Tefft and Tefft
ATTORNEYS Patented Dec. 17, 1929

1,739,616

UNITED STATES PATENT OFFICE

SIMON E. SCHROEDER, OF NEWTON, IOWA, ASSIGNOR, BY MESNE ASSIGNMENTS, TO AUTOMATIC WASHER COMPANY, INC., OF NEWTON, IOWA, A CORPORATION OF DELAWARE

GEAR HOUSING FOR WASHING MACHINES

Application filed January 20, 1928. Serial No. 248,052.

This invention relates to gearing, and more particularly to housing and supporting means for worm and worm gear mechanism.

One of the objects of the invention is in the provision of a simple and efficient mechanism for housing and supporting a worm gear and worm.

Another object is in the provision of a stamped metal housing which is adapted to house a worm gear, there being provided in connection with the stamped metal housing a simple and inexpensive manner of supporting the worm.

Still another object lies in the provision of a housing member, including therein a tubular supporting means for a worm, said supporting means being adapted to be readily inserted within the housing and held therein in an efficient manner at a minimum of expense, without the necessity of costly machining operation.

A further object lies in the provision of a worm supporting mechanism comprising a tubular member carrying the bearing supports for the worm in such manner that the worm may be disposed upon the outer end of a drive shaft, therefore obviating the necessity of expensive machining operations.

Other objects will appear in the following specification, taken in connection with the annexed drawings, in which—

Fig. 1 is a plan view, with portions thereof broken away, of my worm supporting device;

Fig. 2 is an elevational view, partly in section, of the same structure; and

Fig. 3 is an end elevation showing more in detail the manner of housing the worm and worm gear.

Before referring specifically to the drawings, it is thought best to trace, somewhat generally, the previous development work which has taken place in connection with the housing and supporting of worms and worm gears.

The present applicant has, as the art will show, been constantly developing and improving washing machines, and especially the power transmission means utilized therein. As a matter of fact, these developments have been and are always tending towards decreasing the cost of manufacture and providing simpler and more efficient power transmission units.

The present development, as may be seen, is directed primarily to driving means for washing machines. Heretofore, worms and worm gear driving mechanism have been used so universally as to be considered conventional when applied to washing machines. In other words, the use of a worm gear and worm for driving same is practically standard drive for the rotating or oscillating parts of washing machine structures.

The manner of mounting the worm gear and worm has also been almost standard in that the worm was disposed within an oil-tight housing, the housing portion providing, in almost every instance, bearing supports for the worm. In other words, the housing was made of cast iron, with openings therein, or at least recesses, at two places, for the reception of bearing members for supporting the worm. The drive shaft projected into the housing in such manner that the end portion thereof was carried in one of the recesses in the housing, and at a point intermediate its ends it was supported in another recess or opening in the housing. The worm forming part of the drive shaft, was disposed intermediate these bearing portions.

Applicant, as a matter of fact, has utilized a sort of worm and gear drive and supporting mechanism in many of the washing machines which he has developed, the same being undoubtedly efficient and practical, but requiring a manner of manufacture which will be immediately recognized as more expensive than this type of manufacture wherein the parts are formed by stamping the metal in dies. Applicant desires to use a pressed steel housing for his worm and worm gear driving mechanism, and further, of course, to obviate the necessity of expensive machining operations.

In carrying out his purpose, applicant was immediately met by the necessity of supporting his worm within the stamped metal housing, in an efficient manner, as well as accomplishing an assembly which would do away with the before mentioned machining operations. He has accomplished this stamping of the gear housing member and ready assembly and support of the worm gear within the housing in the following manner.

It has not been thought necessary to disclose other structural features directed to washing machine mechanism, inasmuch as same are now so well known as to be almost conventional. A stamped metal gear housing is shown at 10, formed to receive and maintain a satisfactory amount of lubricant therein for the continuous oiling of the moving portions. Bolted, by a plurality of bolt members 11, to said housing, is a cover portion 12.

The above mentioned housing portions provide a complete housing for the worm gear, worm and drive shafts connected thereto contained within the housing. Disposed within the housing there is found a vertically disposed stub shaft 13, which finds its lower support 14 in an additional housing portion 15, secured as at 16, to the first mentioned housing member 10. The only reason for having this bearing support formed in a separate manner is for assembly purposes, as otherwise it might just as well be formed in the same operation as the housing 10.

An upper bearing support for the stub shaft 13 is shown at 17 and is supported by the plural portions 18 and 19 securely bolted at 20 to a horizontally disposed metal plate 21, which is assembled as a unit with the housing portion and forms, as a matter of fact, a part of the housing portion.

Fixedly secured to the upper end of the stub shaft 13 is a crank 22 to which may be attached the driving means for the water-agitating portions of a washing machine or other mechanism for use desired. Secured to the stub shaft 13 is a conventional worm gear 23.

The structure heretofore described is somewhat conventional, except for the fact that the housing 10 is formed by pressing or stamping, rather than as a cast portion. The stamping operation to form housing 10 leaves an opening, through which the worm supporting member may have one of its ends projected.

This worm supporting member or mechanism will now be described. A conventional drive shaft is shown at 24, having formed upon one end thereof the conventional worm 25, which is obviously adapted to mesh with the before mentioned worm gear 23, and when rotated to transmit a similar movement to the worm gear. The outer end 26 of the drive shaft may be connected in any manner to an electric or other power driving unit.

A tubular member 27 surrounds the drive shaft 24 and has its outer end threaded as at 28 and projecting through the before mentioned opening left in the housing member during the stamping operation. This tubular member 27 contains the two roller bearings 29 and 30, which are pressed into the tubular member 27 and obviously operate as bearing supports for the worm 25. Irrespective of the manner of supporting the worm, it must obviously have two supports, and as previously described, these supports, when a cast metal housing was used, were formed within the housing at two spaced points which necessitated careful machining operations. In the present instance, the tubular portion 27 carries the bearing supports at one side of the worm. Positioning of the tubular member within the housing to prevent lateral movement is provided in an inner nut 31 threaded upon the inside of the tubular housing and a cap portion 32 threaded upon the housing exteriorly thereof. It is obvious that movement of these nut portions will securely support the tubular member within the housing and prevent movement. A bearing member 33 is also found within the housing, which when held in position by movement of the cap 32, against supporting member 34, prevents the exit of any of the lubricant from the housing. Obviously, any other means for preventing the exodus of oil might as well be used.

The mechanism for preventing lateral movement of the tubular member has been described and we now turn to means for preventing sideward movement of the tubular member, and therefore holding same securely within the housing, and in proper mesh relationship with the worm gear. This mechanism is provided in a yoke 35, the end portions of which are threaded as at 36 and project through apertures in the housing, the threaded end portions being secured by nuts 37, thus holding the yoke, as well as the tubular member, in a fixed position, not only sideward, but in any direction. It might be suggested that when the yoke 35 has been tightened in such manner that the tubular member 27 is fixedly secured within the housing, there may still be some requirement for adjustment of the worm with respect to the worm gear. Although this is not contemplated, nevertheless it is apparent that if necessary, the yoke might be loosened and shims, not shown, disposed between the tubular member and the inside of the housing in such manner as would absolutely insure the proper engagement of the worm with the worm gear.

As respects the operation of the present device, same is thought obvious, and it is thought necessary merely to explain that applicant has the advantage of using a stamped metal housing member as well as an assembly for the worm gear and worm driving mechanism which the operator may insert within the housing, not only in minimum time but arriving at the proper adjustment of said portions very rapidly. This is a distinct advantage in the assembly of worm and worm gear drive for washing machines or other devices, and is thought clearly novel as respects the tubular member for supporting the worm entirely upon one side, as well as its connecting means with the housing, which permits the before mentioned rapid assembly and accomplishment of same at a minimum of expense.

What I claim is:

1. In a device of the class described, a stamped metal gear housing, a worm gear therein, a worm for driving the worm gear, a drive shaft for the worm, mechanism for supporting the worm within the housing in a meshed relationship with the worm gear, including a tubular member having one of its ends projecting through an aperture in the stamped metal housing, bearing supports for the worm shaft disposed within the tubular member, means including threaded members disposed upwardly and inwardly of the housing secured to the projecting ends of the tubular member to prevent lateral movement of the tubular member, and a yoke member surrounding the tubular member with the housing member in such manner as to hold the worm in meshed relationship with the worm gear.

2. In a device of the class described, including a stamped metal housing, a worm gear disposed therein, bearing supports for the worm gear shaft and mechanism for supporting a worm in a meshed relationship with the worm gear within the housing including a worm shaft, a worm formed on one end of said shaft and meshing with the worm gear, a tubular member disposed within the housing and having an end portion thereof projecting through an aperture in the housing, bearing supports for the worm shaft within said tubular member, and means for fixedly supporting the tubular member within the housing, including means for fixedly securing the projecting end of the tubular member to the housing in a manner to prevent the exodus of oil, and a yoke member for holding the worm in the desired mesh relationship with the worm gear.

3. In a device of the class described, including a stamped metal housing having an opening therein, a worm gear disposed within said housing, a worm adapted to mesh with said worm gear and mechanism for supporting a worm within the housing, including a worm shaft, the worm being formed upon one end of said shaft, supporting means for the worm shaft including a tubular member, bearing supports for the worm shaft within said tubular member and mechanism for fixedly supporting the tubular member within the housing in such manner that the worm maintains an efficient meshed relationship with the worm gear.

4. In a device of the class described, including a housing, a worm gear disposed therein, a worm, supporting means for holding the worm in a meshed relationship with the worm gear, including a worm shaft on one end of which the worm is mounted, supporting means for the worm shaft including a tubular member and roller bearings disposed within the tubular member and supporting the worm shaft, and means for holding the tubular member securely within the housing but permitting sufficient adjustment to insure proper meshing of the worm with the worm gear.

In testimony whereof I have hereunto affixed my signature.

SIMON E. SCHROEDER.